4455

REISSUED JUL 4 1871

Witnesses
John Rathbone Jr
W. L. Bennem

Henry G. Fisk
Thomas R. Clark } assignees
Thomas J. Flagg
by their attorney
E. S. Renwick June 19-71 - Issue by Comm'r

UNITED STATES PATENT OFFICE.

H. G. FISK, THOMAS R. CLARK, AND THOMAS J. FLAGG, OF NEW YORK, N. Y., ASSIGNEES OF HENRY HEATH.

IMPROVEMENT IN DRAWERS.

Specification forming part of Letters Patent No. 73,975, dated February 4, 1868; reissue No. 4,455, dated July 4, 1871.

*To all whom it may concern:*

Be it known that I, HENRY HEATH, of the city, county, and State of New York, have invented or produced certain new and useful Improvements in the article of manufacture known as Men's Drawers; and that the following is a full, clear, and exact description of the same, reference being had to the accompanying drawing, in which—

Figure 2:
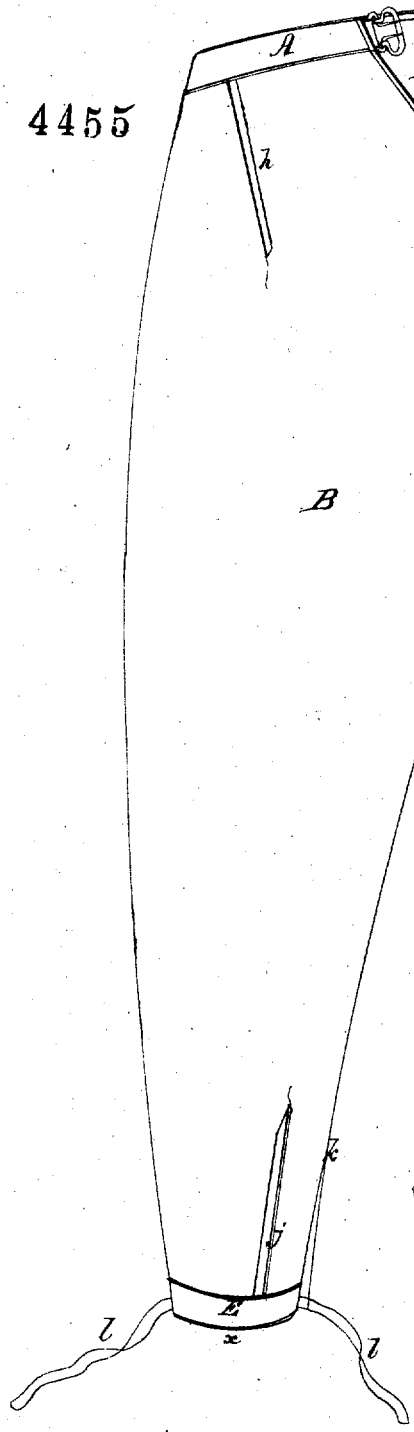
Figure 1:
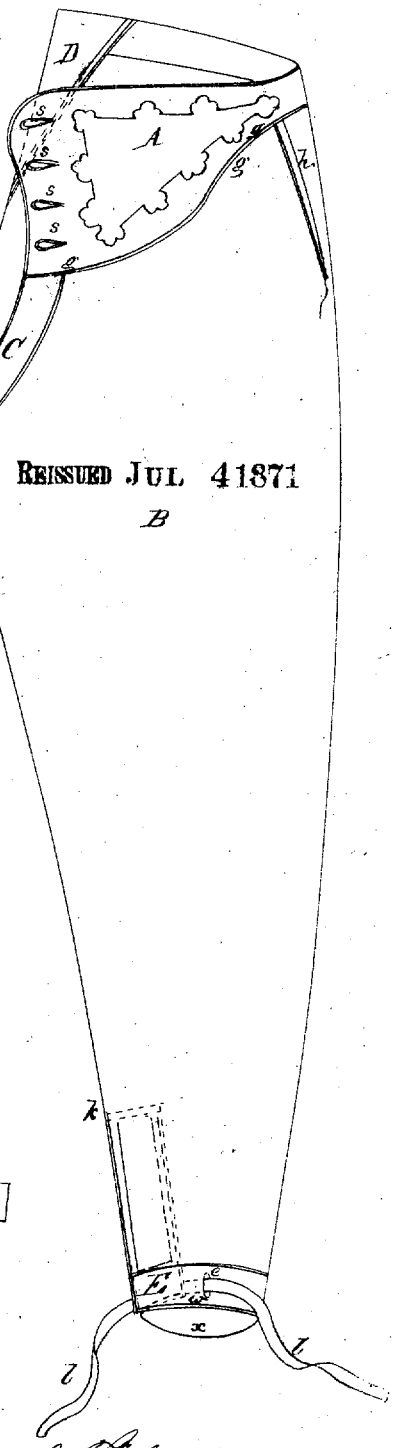
Figure 3:
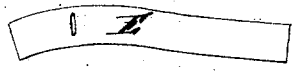

Figure 1 represents a front view of one leg of my new men's drawers, and Fig. 2 represents a rear view of the same. Fig. 3 represents a view of one of the ankle-bands detached and extended.

My invention consists, first, of the combination of a waistband pointed in front (so as to set close to the belly of the wearer) with a full leg having triangular portions removed in the vicinity of waist, so that the requisite fullness for the hips and rump is secured without the necessity of gathering the material at the waist. My invention consists, further, of the combination of the ankle-band at the lower end of the leg with a full leg having a triangular portion removed, so that the requisite fullness of leg is secured without a surplus of material in the vicinity of the ankle. My invention consists, further, of the combination in the same drawers of both of the above peculiarities. My invention consists, further, of the combination of the leg of the drawers with a curved ankle-band, whereby the band, when on the drawers, conforms itself to the taper of the drawers-leg instead of forming an angle therewith, as it would do if cut straight.

The drawers represented in the accompanying drawing show the manner in which I have embodied my invention. The article is composed substantially of a waistband, A, in two parts, (one for each leg,) two legs, B, the front facings C, rear gore D, and two ankle-bands, E. The waistband A is cut pointed in front, as represented in the drawing, so that the seam *g g* between it and the leg B corresponds substantially with the form of the outline of the belly of the wearer. Each leg B is cut out by preference of a single piece of goods and of the required fullness, and two triangular portions are removed from its upper end, so that the size there is reduced (by sewing together the edges formed by cutting and producing the seams *h h'*) to the size of the waistband. The lower end of each leg has also a triangular piece removed from it so as to reduce it to the size of the ankle, the edges of the cut produced by the removal being united in a seam, *j*. The long edges of the leg-piece are connected by a seam at the inner side *k k* of the leg. Each ankle-band E is cut to a curved form, as represented detached at Fig. 3; hence when it is sewed to the drawers-leg and applied to the leg of the wearer it assumes a slightly-conical form corresponding in taper with the slope or taper of the drawers-leg. The curvature of the band may be such that it will rise in front, as at *w*, over the instep of the wearer, and will descend at the rear, as at *x*. These ankle-bands E are sewed to the lower ends of the legs B and are provided with strings *l*, one of which is passed through a hole, *e*, so that the underlapping portion of the band may be drawn smoothly to its place. The waistband upon one leg is provided with button-holes *s s s s*, and that upon the other leg is provided with corresponding buttons. The rear end of one part of the waistband is provided with a buckle, and that of the other part with a tongue to enter the said buckle. The two legs are seamed together at the line *k m*, and connected above the upper end of said line by the rear gore D.

The drawers thus produced are remarkable for their easy and graceful set, and are free from the puckering and gathering hitherto found in such garments.

Having thus described my improved drawers, I declare that I am well aware that triangular pieces have been removed from various garments for the purpose of reducing their dimensions at the place of removal; and, therefore, I do not claim, broadly, the mode of reducing the dimensions of a garment by such a removal. I am also aware that strings, buttons, and buckles have been used for fastening the parts of drawers, and, therefore, do not claim any mode of fastening; but

What I claim as my invention in men's drawers, and desire to secure by Letters Patent, is—

1. The combination of the pointed waistband of the drawers with a full leg having triangular portions removed from its upper end so as to obtain the requisite fullness at the hips and waist without the necessity of gather.

2. The combination of the ankle-band of the drawers with a full leg having a triangular portion removed from its lower end so that the requisite fullness of the leg is secured without a surplus of material in the vicinity of the ankle.

3. The combination of the pointed waistband of the drawers, ankle-band, and full leg having triangular portions removed at both ends, substantially as before set forth.

4. The combination of the leg of the drawers with a curved ankle-band, as before set forth.

In testimony whereof I have hereto set my hand this 1st day of December, A. D. 1868.

HENRY HEATH.

Witnesses:

WM. F. LETT,

F. C. JONES.